United States Patent [19]

Takata et al.

[11] Patent Number: 4,871,633
[45] Date of Patent: Oct. 3, 1989

[54] PHOTOSENSITIVE MEMBER COMPRISING AZO COMPOUND HAVING PYRIDINE-N-OXIDE OR PYRIDAZINE-N OXIDE

[75] Inventors: Masakazu Takata, Hirakata; Takamasa Ueda, Ibaraki; Kimiyuki Ito, Kawanishi; Tsuneaki Hirashima, Sakai; Souichi Yamamoto, Yao; Yoshio Ishino, Kyoto; Toshinobu Ohno, Moriguchi, all of Japan

[73] Assignees: Minolta Camera Kabushiki Kaisha; Osaka Municipal Government, both of Osaka, Japan

[21] Appl. No.: 124,613

[22] Filed: Nov. 24, 1987

[30] Foreign Application Priority Data

Nov. 25, 1986 [JP] Japan ................................ 61-281543

[51] Int. Cl.$^4$ ............................................. G03G 5/06
[52] U.S. Cl. ........................................ 430/58; 430/76; 430/77
[58] Field of Search ..................... 430/76, 78, 58, 77

[56] References Cited

U.S. PATENT DOCUMENTS

| 4,032,339 | 6/1977 | Grushkin et al. | 430/69 |
|---|---|---|---|
| 4,062,854 | 12/1977 | Grushkin | 260/295 A |
| 4,123,270 | 10/1978 | Heil et al. | 430/73 |
| 4,272,598 | 6/1981 | Sasaki et al. | 430/72 |
| 4,396,695 | 8/1983 | Dimmler et al. | 430/59 |
| 4,396,696 | 8/1983 | Nagasaka et al. | 430/78 |
| 4,426,432 | 1/1984 | Sawada et al. | 430/58 |
| 4,515,881 | 5/1985 | Sawada et al. | 430/58 |
| 4,533,613 | 8/1985 | Kawamura et al. | 430/78 |
| 4,537,847 | 8/1985 | Takahashi et al. | 430/78 |
| 4,540,651 | 9/1985 | Fujimaki et al. | 430/72 |
| 4,554,231 | 11/1985 | Ishikawa et al. | 430/59 |
| 4,582,771 | 4/1986 | Ohta | 430/58 |
| 4,631,242 | 12/1986 | Emoto et al. | 430/58 |
| 4,647,520 | 3/1987 | Watanabe et al. | 430/58 |
| 4,663,442 | 5/1987 | Ohta | 534/759 |
| 4,672,149 | 6/1987 | Yoshikawa et al. | 136/263 |
| 4,687,721 | 8/1987 | Emoto et al. | 430/58 |
| 4,702,982 | 10/1987 | Matsumoto et al. | 430/78 |
| 4,716,220 | 12/1987 | Tsutsui | 534/738 |
| 4,743,523 | 5/1988 | Yamashita et al. | 430/59 |
| 4,760,003 | 7/1988 | Matsumoto et al. | 430/58 |

FOREIGN PATENT DOCUMENTS

| 54-22834 | 2/1979 | Japan . |
|---|---|---|
| 55-117151 | 2/1979 | Japan . |
| 59-214034 | 12/1984 | Japan . |
| 60-19152 | 1/1985 | Japan . |
| 60-121451 | 6/1985 | Japan . |
| 61-272755 | 12/1986 | Japan . |

Primary Examiner—John L. Goodrow
Attorney, Agent, or Firm—Burns, Doane, Swecker & Mathis

[57] ABSTRACT

The present invention uses an azo pigment having in the center of an N-oxide heterocyclic structure as a photoelectrical charge-generating material. The pigments are excellent in dispersion stability in a dispersed solution, and enable the provision of a photosensitive member excellent in sensitivity properties.

7 Claims, No Drawings

PHOTOSENSITIVE MEMBER COMPRISING AZO COMPOUND HAVING PYRIDINE-N-OXIDE OR PYRIDAZINE-N OXIDE

BACKGROUND OF THE INVENTION

The present invention relates to a photosensitive member having a novel azo pigment in its photoelectrical charge generating layer.

Photosensitive members, having an electrically conductive substrate which is coated with a resin binder having organic charge-generating material dispersed therein, are commonly employed in practical use, because of the reasons such as their low toxity, simple manufacturing process, low costs.

Typical organic charge-generating materials having been proposed are phthalocyanine, TNF, PVK, perylene derivative or the like, each of which is used together with an appropriate charge-transporting material such as a hydrazone compound, oxadiazole compound or the like.

Recently, various azo pigments used in a charge-generating layer have been proposed.

However, there has not been a report disclosing an organic photosensitive member containing an azo pigment with an N-oxide nitrogen-containing heterocyclic compound in the center of its structure.

SUMMARY OF THE INVENTION

Conventionally, in the manufacturing process for a photosensitive member, there arises such serious disadvantages that the poor dispersion stability of a pigment dispersion solution for a charge-generating coating adversely affects the pot life and the properties of performance and form of final coated layer. These disadvantages are one of the causes of the deteriorated photosensitive properties such as photosensitivity, color-sensitivity.

The object of the present invention is to solve such disadvantages and provide a novel azo pigment as a charge-generating material for an organic photosensitive member, which excels in photosensitivity, color-sensitivity and repetition stability as well as dispersion stability of the coating solution.

DETAILED DESRIPTION OF THE INVENTION

The present invention relates to a photosensitive member having an photoconductive layer comprising an azo compound represented by the following General Formula (I) or (II);

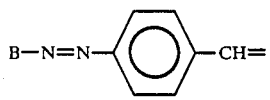

[I]

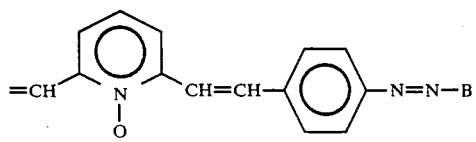

[II]

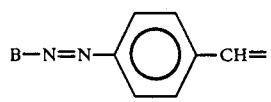

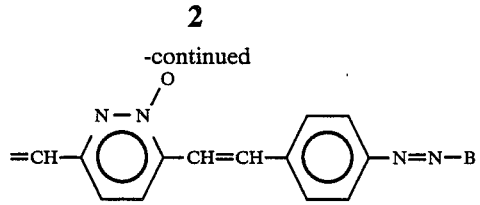

wherein B represents a coupler expressed by any one of Formulae (III) through (VIII);

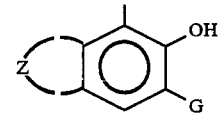

[III]

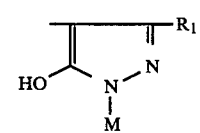

[IV]

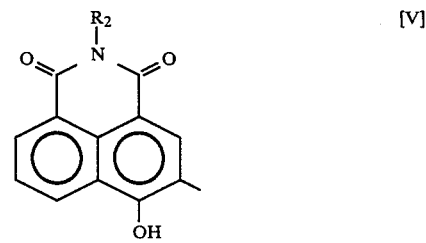

[V]

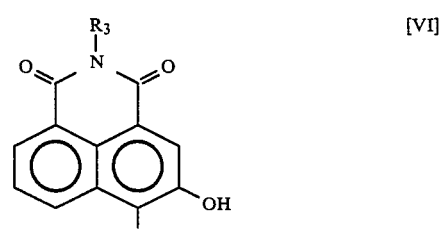

[VI]

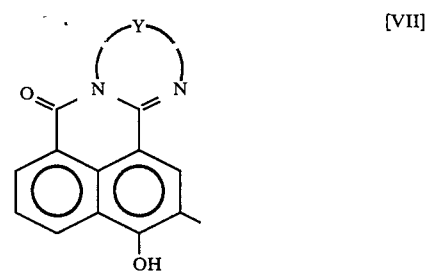

[VII]

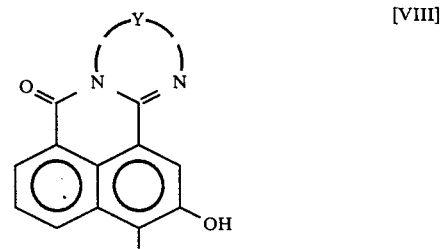

[VIII]

where,

Z represents a group of atoms, necessary for forming an aromatic carbon ring or an aromatic heterocycle each of which may have a substituent;

G represents a carbamoyl or sulfamoyl group each of which may have a substituent.

$R_1$ represents a hydrogen atom, or an alkyl group, an amino group or carbamoyl group, each of which may have a substituent, a carboxyl group or an ester group thereof, or a cyano group;

M represents an aryl group which may have a substituent;

$R_2$ and $R_3$ independently represent an alkyl group or an aralkyl group each of which may have a substituent, or an unsubstituted aryl group;

Y represents a bivalent aromatic hydrocarbon group or a group having an nitrogen atom within a ring).

The bisazo pigment of the invention is highly sensitive and excellent in dispersibility. The interaction between pigments as well as the interaction between a dispersing solvent used for forming a photosensitive layer and a pigment seem to effect uniform dispersion because of the presence of N-oxide group in the structure of a bisazo pigment.

In General Formula (I), B represents a coupler expressed by any one of the following General Formulae (III) through (VIII):

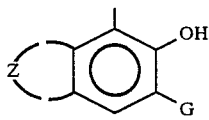

[III]

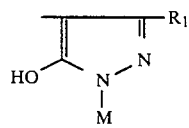

[IV]

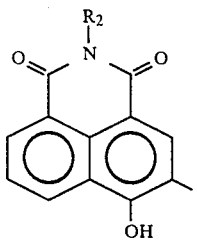

[V]

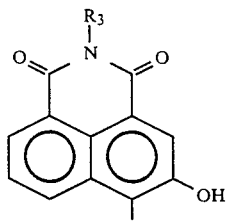

[VI]

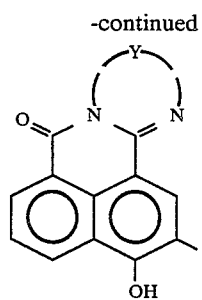

[VII]

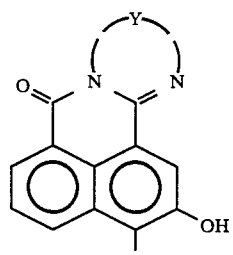

[VIII]

wherein
in General Formula (III);
Z represents a group of atoms necessary for forming an aromatic carbon ring or an aromatic heterocycle each of which may have a substituent;
G represents a carbamoyl group or sulfamoyl group each of which may have a substituent.

The examples of a favorable group represented by General Formula (III) include 2-hydroxy-3-phenylcarbamoyl naphthalene and 2-hydroxy-3-phenylcarbamoyl-11H-benzo (α) carbazole.

In General Formula (IV);
$R_1$ represents a hydrogen atom, or an alkyl group, an amino group or carbamoyl group, each of which may have a substituent, a carboxyl group or an ester group thereof, or a cyano group;

M represents an aryl group which may have a substituent;

A preferred group represented by General Formula (IV) is a 3-methyl-1-phenyl-5-pyrazolone group of the like.

In General Formula (V) or (VI), $R_2$ and $R_3$ independently represent an alkyl group or an aralkyl group each of which may have a substituent, or an unsubstituted aryl group.

A preferred group represented by either General Formula (V) or (VI) is an imide of N-methyl-4-hydroxynaphthalic acid, imide of N-methyl-3-hydroxynaphthalic acid or the like.

In General Formula (VII) or (VIII);
Y represents a bivalent aromatic hydrocarbon group or a bivalent group having an nitrogen atom within a ring).

A preferred group represented by General Formula (VII) or (VIII) is 3-hydroxy- or 4-hydroxy-7H-benzimidazo(2,1-a)benz(d e)isoquinoline-7-one or 2-hydroxy- or 5-hydroxy-7H-benzimidazo(2,1-a)benz(d e) isoquinoline-7-one, or the like.

An azo compound represented by General Formula (I) or (II) is prepared by oxidizing a nitro compound represented by the following formula (I-a) or (II-a);

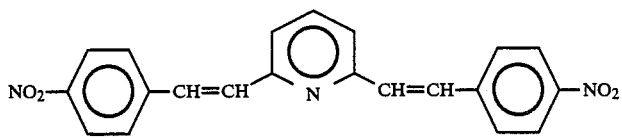
(I-a)

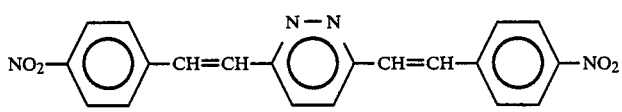
(II-a)

With a peroxide such as hydrogen peroxide, organic peroxy acid or the like to obtain a N-oxide compound, reducing selectively the nitro group of the N-oxide compound under a neutral or basic condition to obtain an amino compound, and then converting the amino compound into a diazo compound used in a coupling reaction in accordance with a conventional method.

Coupling agents employed in the invention are coupling residues represented by any of General Formulae (III) through (VIII), below, may be used, but are not necessarily limited;

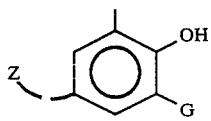 [III]

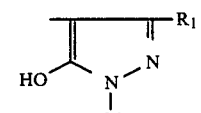 [IV]

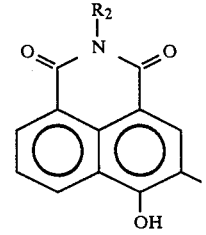 [V]

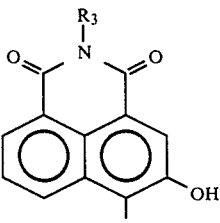 [VI]

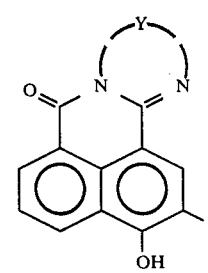 [VII]

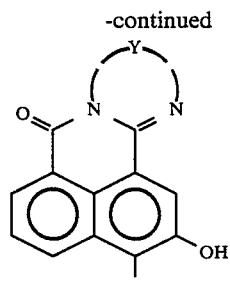 [VIII]

wherein Z, G, $R_1$, $R_2$, $R_3$, M and Y are the same as previously described.

A photosensitive member of the invention may be either a dispersion type containing an azo pigment represented by General Formula (I) or (II) in a photoconductive layer, or a function-separated type which has a charge-generating layer and a charge-transporting layer and contains a pigment represented by either General Formula (I) or (II) in the charge-generating layer.

A dispersion type photosensitive member, the similar member of the invention can be prepared in the following manner; first, an azo pigment represented by either General Formula (I) or (II) together with binder resin and, if desired, with a charge-transporting material are dissolved or dispersed into an appropriate solvent using a ball mill or the like to form a coating solution, and then the coating solution is applied to an electrically conductive substrate by means of a spinner coating process, blade coating process, dipping coating process or the like, to form a photoconductive layer having a thickness of, usually, 5 to 30 μm, preferably, 6 to 20 μm after dried.

An azo pigment (I) or (II) of the invention excels in the dispersibility to a solvent. Accordingly, the pigment contributes well to the pot life of coating solution, as well as the uniformity of coated layer. The dispersibility is attributable to an effective interaction such as hydrogen bonding, between the N-oxide group in a compound (I) or (II) of the invention and a dispersing solvent.

The examples of dispersing solvents used for dispersing charge-generating materials include an aromatic solvent such as toluene and xylene; an ether solvent such as tetrahydrofuran and dioxane; an amide solvent such as N,N-dimethylformaldehyde; a ketone solvent such as cyclohexanone and methylethylketone; halogenated hydrocarbon solvent such as 1,2-dichloroethane, trichloroethane; and others.

An azo pigment of the invention is compounded at a rate of 0.5 to 50 weight %, preferably, 0.5 to 5 weight % to a binder resin in a photoconductive layer. An amount of the resin. An amount of addition less than 0.5 weight % does not provide satisfactory sensitivity; an amount of addition exceeding 5 weight % causes disadvantages such as poor charge property, poor coatability and the like. The examples of preferred charge-transporting material are as follows:

triphenylamine represented by the following formula;

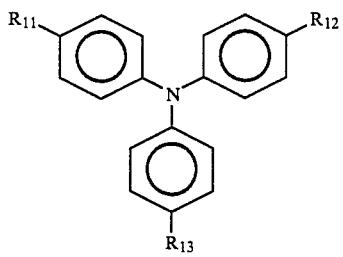

(wherein $R_{11}$, $R_{12}$ and $R_{13}$ independently represent a hydrogen atom, an alkyl group, an alkoxy group, a halogen atom, a hydroxy group, a cyano group, a dialkylamino group, a diarylamino group or a nitro group);

pyrazoline represented by the following formula;

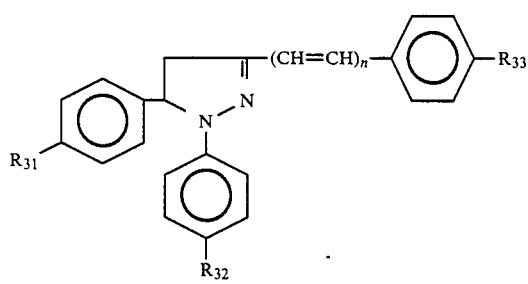

(wherein $R_{31}$, $R_{32}$ and $R_{33}$ independently represent a hydrogen atom, an alkyl group, an alkoxy group, a halogen atom, a hydroxy group, a cyano group, a dialkylamino group, a diarylamino group, a diaralkyl group or a nitro group, and n represents an integer of 1 or 2);

stylbene represented by the following formula;

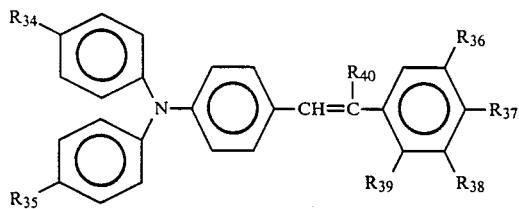

(wherein $R_{34}$, $R_{35}$, $R_{36}$ $R_{37}$, $R_{38}$ and $R_{39}$ independently represent a hydrogen atom, an alkyl group, an alkoxy group, a halogen atom, a hydroxy group, a cyano group, a dialkylamino group, a diarylamino group, a diaralkyl group or a nitro group, and $R_{40}$ represents a hydrogen atom or a phenyl group);

hydrazone represented by the following formula;

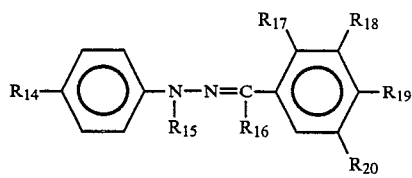

(wherein $R_{14}$, $R_{17}$, $R_{18}$ $R_{19}$ and $R_{20}$ independently represent a hydrogen atom, an alkyl group, an alkoxy group, a halogen atom, a hydroxy group, a cyano group, a dialkylamino group, a diarylamino group, a diaralkyl group, a diaralkylamino group or a nitro group; $R_{15}$ represents an alkyl group or a phenyl group which may have a substituent or a naphthyl group which may have a substituent; and $R_{16}$ represents a hydrogen atom, an alkyl group, a cyano group or a phenyl group which may have a substituent);

carbazole hydrazone represented by the following formula;

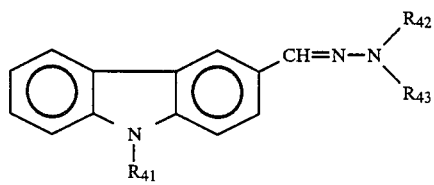

(wherein $R_{41}$, $R_{42}$ and $R_{43}$ independently represent an alkyl group or an aromatic ring each of which may have a substituent.);

and a butadiene compound represented by the following formula;

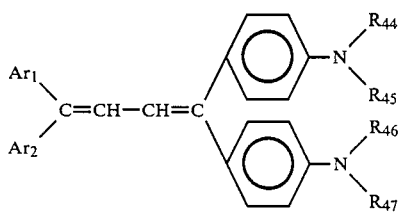

(wherein $Ar_1$ and $Ar_2$ independently represent an aromatic hydrocarbon residue such as a phenyl group or a naphthyl group; $R_{44}$ through $R_{47}$ independently represent an alkyl group such as a methyl group or an ethyl group; or an aryl group such as a phenyl group or a naphthyl group; or a benzyl group.)

In the present invention, the preferred charge-transporting materials are N-ethylcarbazole-3-carbaldehyde methylphenyl hydrazone (MPH) represented by the following formula;

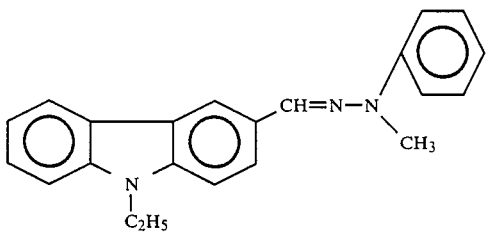

and 1,1-diphenyl-4,4-bis(p-diethylaminophenyl)-1,3-butadiene represented by the following formula;

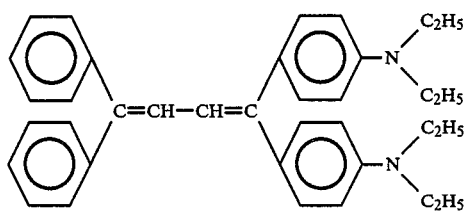

An arbitrary binder may be used in order to form a carrier-generating layer or a carrier transporting layer. However, the preferred binder is a hydrophilic, electrically insulative, and film-forming polymer having a high dielectric constant. The typical polymers, not necessarily limited to the following examples, include polycarbonate, polyester, methacrylic resin, acrylic resin, polyvinyl chloride, polyvinylidene chloride, polystyrene, polyvinyl acetate, styrene-butadiene copolymer, vinylidene chloride-acrylonitrile copolymer, vinyl chloride-vinyl acetate copolymer, vinyl chloride-vinyl acetate-maleic anhydride copolymer, silicon resin, silicon-alkyd resin, phenolformaldehyde resin, styrene-alkyd resin, poly-N-vinyl carbazole, polyvinyl butyral and polyvinyl formal.

These binders may be used singly or in combinations of more than two.

These resins should preferably have, when measured singly, a volume resistivity of $1 \times 10^{14}$ $\Omega$cm or more.

A separated-function type photosensitive member of the invention is prepared as follows: first, a coating solution prepared by dispersing an azo pigment of the invention into a solution having dissolved a binder resin is applied to and dried on an electrically conductive substrate in order to form a charge generating layer; a solution prepared by dissolving a charge-transporting material and an appropriate binder resin is applied to and dried on the already formed charge-generating layer in order to form a charge-transporting layer. The thickness of the charge-generating layer is 0.01 to 5 $\mu$m, preferably, 0.05 to 2 $\mu$m; the amount of azo pigment added is 0.5 to 50 weight %, preferably, 0.5 to 5 weight %, to binder resin of the charge-generating layer. The thickness of the charge-transporting layer is 2 to 100 $\mu$m, preferably, 10 to 20 $\mu$m; the amount of charge-transporting material is 10 to 80 weight %, in particular, 25 to 75 weight %, to binder resin of the charge-transporting layer. The same charge-transporting material and binder resin as employed in a dispersion-type photosensitive member may be used. Additionally, in a function-separated type photosensitive member of the invention may be disposed a charge-generating layer in the upper side, and the charge-transporting layer in the substrate side, or vice versa.

An example of a synthesizing method for a bisazo compound (P - 1) represented by General Formula (I), wherein B in the formula is 2-hydroxy-3-phenyl carbamoyl naphthalene represented by General Formula (III), is as follows:

Example of synthesizing method for bisazo compound (P - 1)

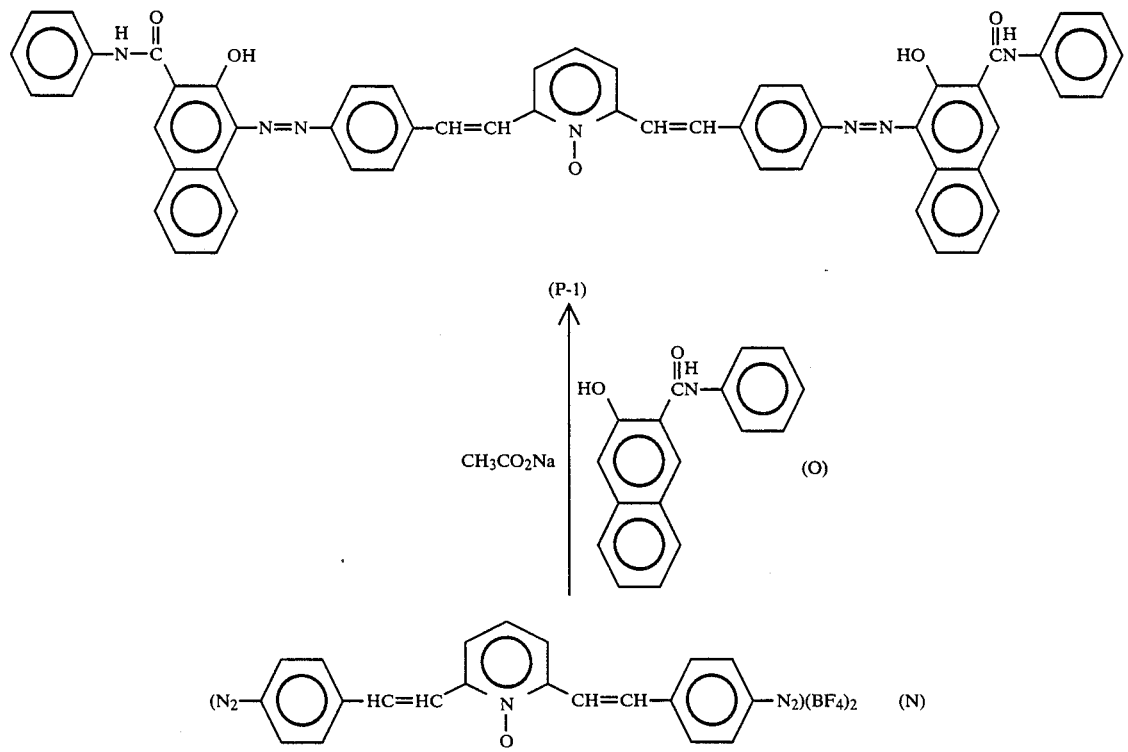

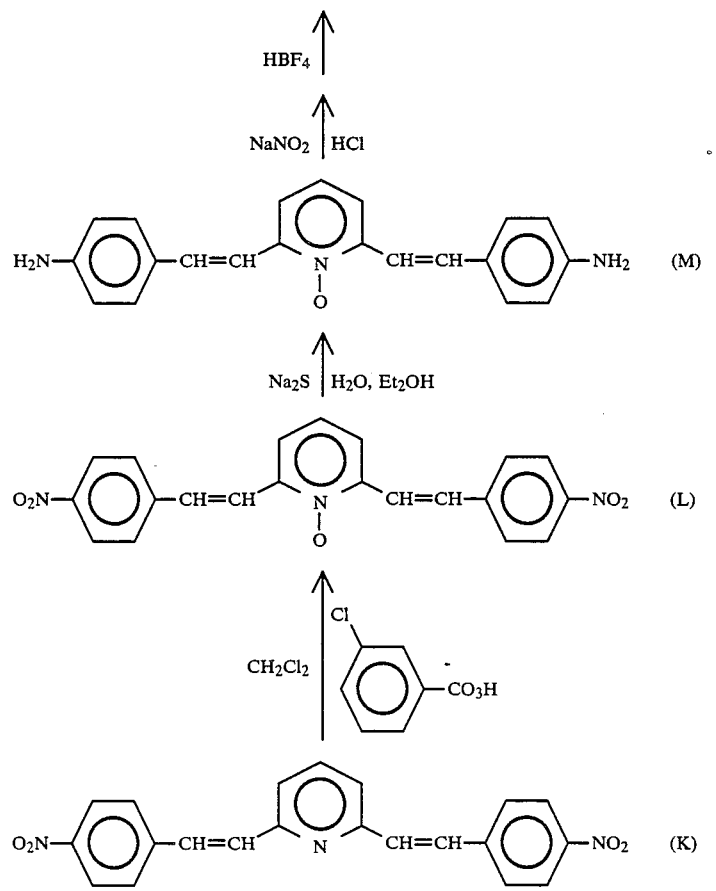

More specifically, the synthesizing procedure is as follows. 2,6-dimethylpyridine or a substituted product thereof, is reacted with p-nitrobenzenealdehyde or a substituted product according to a method described, for example, in Journal of Organic Chemistry, vol. 15, P. 1184 (1950) to synthesize 2,6-di(p-nitrostyryl)pyridine (K). 30 g of this nitro compound is reacted wtih 27 g of m-chloroperbenzoic acid in three liter of dichloromethane to obtain 24 g of 2,6-di(p-nitrostyryl)pyridine-N-oxide. 24 g of this pyridine-N-oxide is reacted with 90 g of sodium sulfide in a solution mixed four liter of water with four liter of ethanol to reduce nitro group selectively and form 18 g of 2,6-di(p-aminostyryl)pyridine-N-oxide (M). The N-oxide amino compound is converted into a diazo compound according to a conventional method, and thereby tetrazonium salt is isolated as 15 g of hydroborofluoric salt (N). 5.0 g of the tetrazonium salt (N) and 5.0 g of 2-hydroxy-3-phenyl-carbamoylnaphthalene (O) were dissolved in one liter of DMF, to which aqueous sodium acetate solution (7 g/100 ml) was added to perform coupling reaction. After two hours of stirring, the resultant crystals were separated by filtration, and the crystals were rinsed three times respectively with five liter water, three times respectively with five liter THF, then dried, to obtain 4.0 g of the final product, azo compound (P - 1).

Similarly, azo compounds P - 2 through P - 4 were prepared. The structure, the decomposition point and the elementary analysis result of compounds P - 1 through P - 4 are listed in Tables through 3 respectively.

TABLE 1

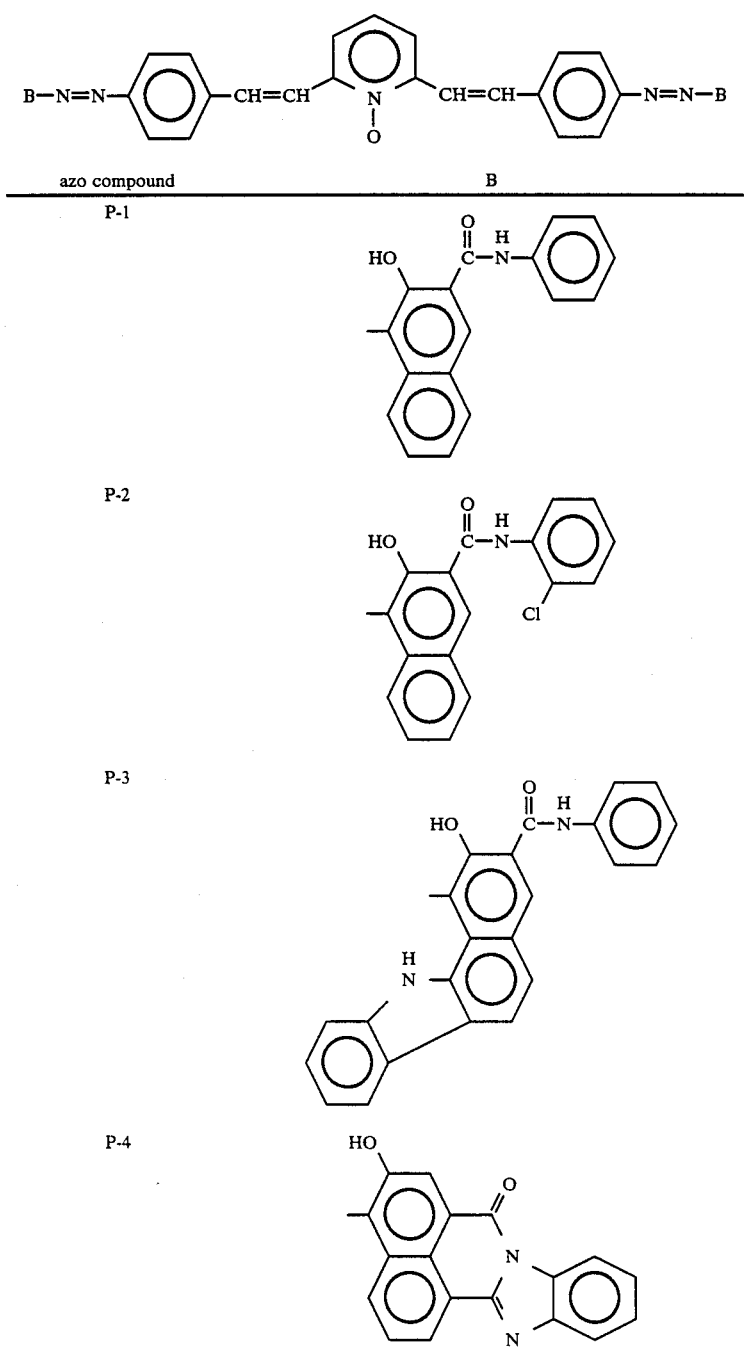

| azo compound | B |
|---|---|
| P-1 | (2-hydroxy-3-naphthoyl anilide group) |
| P-2 | (2-hydroxy-3-naphthoyl 2-chloroanilide group) |
| P-3 | (hydroxy-carbazole carboxanilide group) |
| P-4 | (hydroxy-benzimidazole-perinone group) |

TABLE 2

| Azo compound | Decomposition point |
|---|---|
| P - 1 | 290° C. or more |
| P - 2 | 290° C. or more |
| P - 3 | 290° C. or more |
| P - 4 | 290° C. or more |

TABLE 3

| | | H(%) | C(%) | N(%) |
|---|---|---|---|---|
| P - 1 | Found value | 4.72 | 74.93 | 11.53 |
| | Calculated value | 4.48 | 75.24 | 11.17 |
| P - 2 | Found value | 4.00 | 70.08 | 10.21 |

TABLE 3-continued

| | | H(%) | C(%) | N(%) |
|---|---|---|---|---|
| | Calculated value | 3.94 | 69.77 | 10.36 |
| P - 3 | Found value | 4.41 | 75.95 | 12.13 |
| | Calculated value | 4.29 | 76.20 | 11.94 |
| P - 4 | Found value | 3.97 | 73.74 | 13.92 |
| | Calculated value | 3.60 | 74.10 | 13.64 |

An example of a synthesizing method for a bisazo compound (P - 5) represented by General Formula (II), wherein B in the formula is 2-hydroxy-3-phenyl carbamoyl naphthalene represented by General Formula (III), is as follows:
Example of synthesizing method for bisazo compound (P - 5)
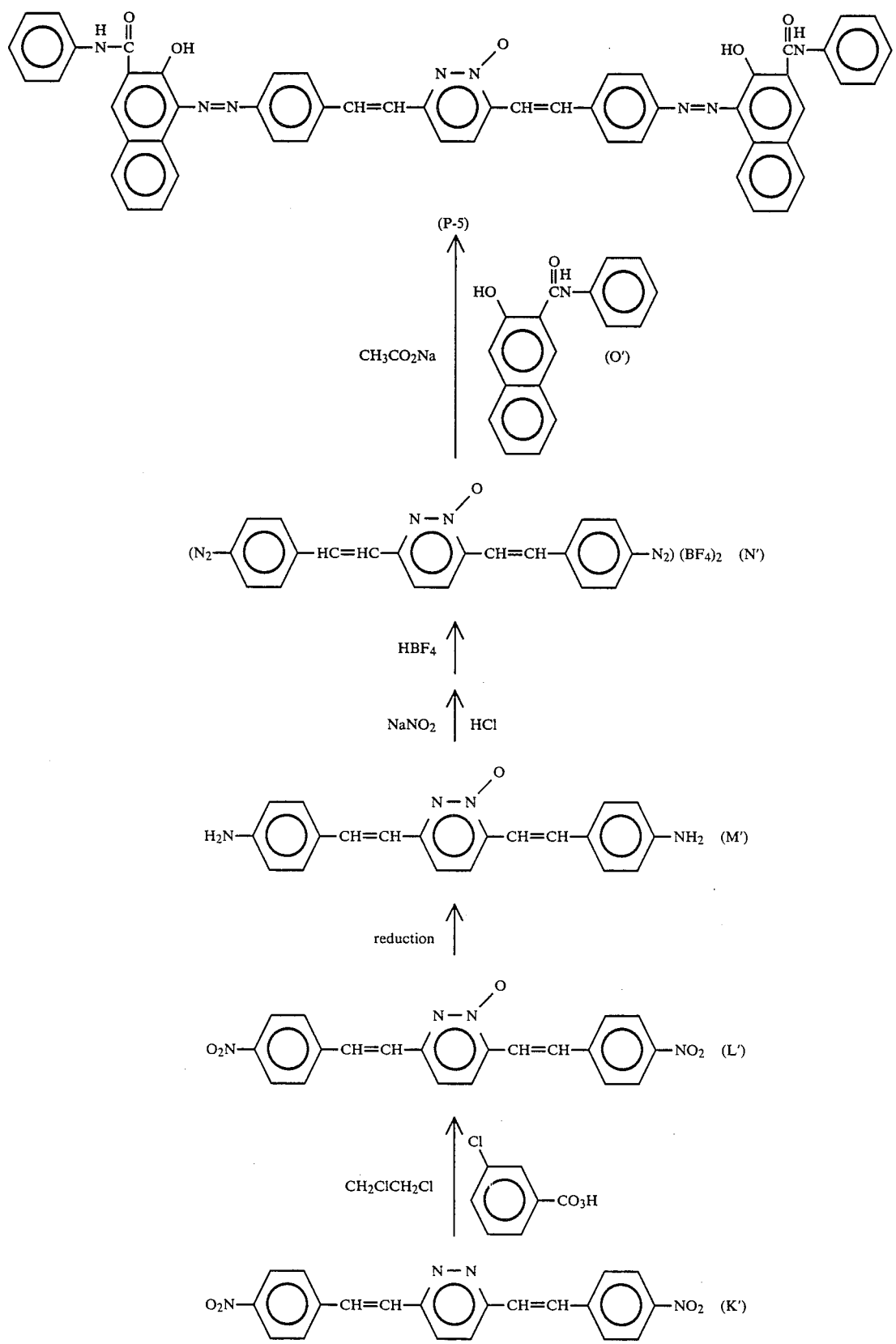

24 g of 3,6-dimethylpyridazine and 60 g of p-nitrobenzenealdehyde are dissolved in one liter of acetic acid anhydride, which is heated and refluxed to obtain 33 g of 3,6-di(p-nitrostyryl)pyridazine (K').

33 g of this nitro compound (K') is reacted, with 15g of m-chloroperbenzoic acid in halogen-containing solvent (such as 1,2-dichloroethane) to obtain 27 g of 3,6-di(p-nitrostyryl)pyridazine-N-oxide (L'). The nitro group in the N-oxide compound (L') is selectively reduced under a neutral or basic condition to obtain 20 g of vermilion crystals of 3,6-di(p-aminostyryl)pyridazine-N-oxide (M').

Using 20 g of the amino compound (M'), diazo conversion reaction as well as coupling reaction are performed in accordance with a known method, to obtain 20 g of biszao dye (P-5). Bisazo dye (P - 5):

Black-purple crystals
Decomposition point, 280° C. or more.

The starting material, 3,6-dimethylpyridazine, is redily prepared by condensing γ-diketone with hydrazine in accordance with the description, for example, in Journal of American Chemical Society, 78, 1961 (1956).

Additionally, according to the above synthesizing example, the step of converting a nitrogen atom in pyridazine ring to an oxide is performed after the synthesisi of styryl compound. However, this oxidizing step may be performed in the stage of dimethylpyridazine compound.

Similarly, azo compounds P - 6 through P - 8 are prepared. The structure, the decomposition point and the elementary analysis result of compounds P - 5 through P - 8 are listed in Tables 4 through 6 respectively.

TABLE 4

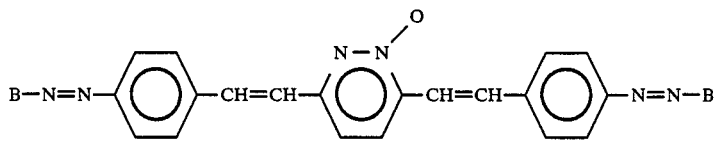

| azo compound | B |
|---|---|
| P-5 | 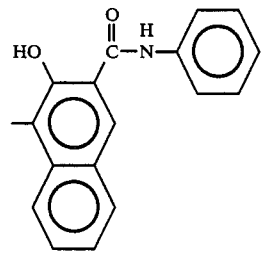 |
| P-6 | 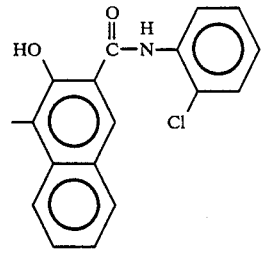 |
| P-7 | 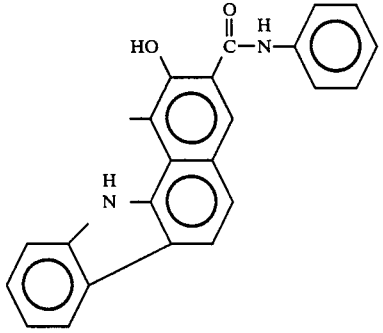 |

TABLE 4-continued

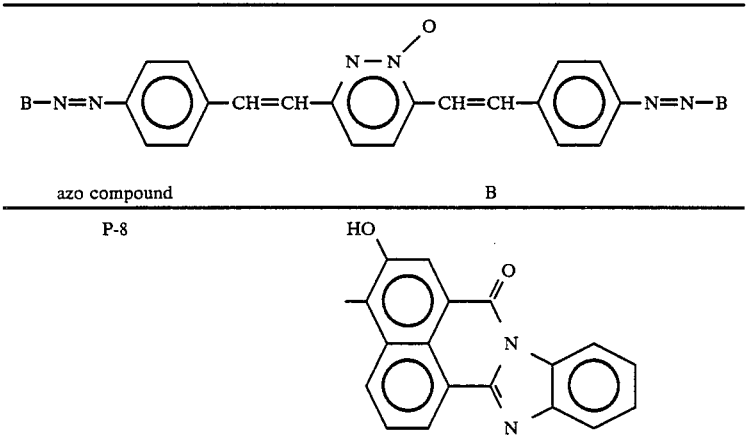

| azo compound | B |
|---|---|
| P-8 | (structure shown above) |

TABLE 5

| Azo compound | Decomposition point |
|---|---|
| P - 5 | 260° C. or more |
| P - 6 | 280° C. or more |
| P - 7 | 280° C. or more |
| P - 8 | 250° C. or more |

TABLE 6

| | | H(%) | C(%) | N(%) |
|---|---|---|---|---|
| P - 5 | Found value | 4.51 | 74.03 | 12.72 |
| | Calculated value | 4.36 | 73.79 | 12.75 |
| P - 6 | Found value | 3.93 | 68.30 | 11.77 |
| | Calculated value | 3.82 | 68.43 | 11.82 |
| P - 7 | Found value | 4.42 | 74.94 | 13.05 |
| | Calculated value | 4.38 | 74.85 | 13.22 |
| P - 8 | Found value | 3.84 | 72.41 | 15.03 |
| | Calculated value | 3.70 | 72.56 | 15.11 |

EXAMPLE 1

2 g of azo compound (P - 1) and 2 g of polyester resin "Byron 200" manufactured by Toyobo Co., Ltd., were dispersed in 100 g of cyclohexanone with a ball mill for 12 hours. This dispersed solution was applied on a polyester film having metallized aluminum, to form a carrier-generating layer of 0.1 μm in thickness after dried. On the carrier-generating layer was applied a solution prepared by dissolving 10 g of hydrazone compound (H - 1) below, and 10 g of polycarbonate resin "K-1300" manufactured by Teijin Chemicals Ltd. in 50 g of tetrahydrofuran, to form a carrier-transporting layer of 20 μm thickness after dried. Thus the photosensitive member according to the invention was prepared.

The surface of photosensitive member was charged to -500 V by a charger and irradiated with a halogen lamp, and an half-reduction exposure E1/2 which is necessary for reducing the surface potential to a half of an original level was measured.

Hydrazone compound (H - 1)

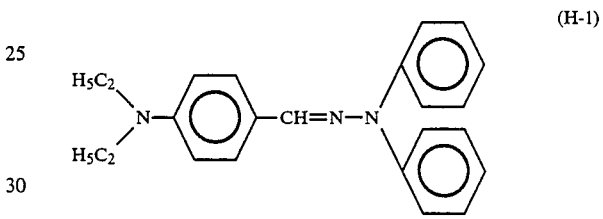

Table 7 lists the measurement results.

EXAMPLES 2–4

Using respective azo compounds (P - 2 through P -4) as well as hydrazone compound (H - 1), these examples were performed in a similar way as Example 1. Table 7 lists the results.

EXAMPLES 5–8

Using respective azo compounds (P - 1 through P -4) and hydrazone compound (H - 2) shown below, these examples were performed in a similar way as Example 1. Table 7 lists the results.

Hydrazone compound H - 2

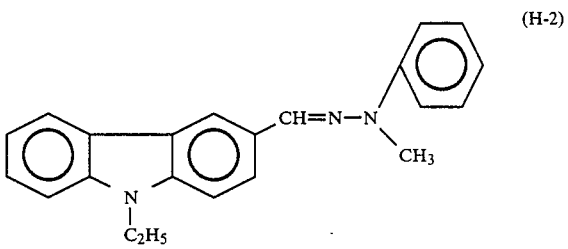

EXAMPLE 9

2 g of azo compound (P - 5), 2 g of polyester resin "Byron 200" manufactured by Toyobo Co., Ltd., were dispersed in 100 g of cyclohexanone with a ball mill for 12 hours. This dispersed solution was applied on a polyester film metallized aluminum to form a carrier-generating layer of 0.1 μm in thickness after dried. On the carrier-generating layer was applied a solution prepared by dissolving 10 g of hydrazone compound (H -

2) below, 10 g of polycarbonate resin "K-1300" manufactured by Teijin Chemicals Ltd. in 80 g of dichloromethane to form a carrier-transporting layer of 20 μm thickness after dried. Thus the photosensitive member according to the invention was prepared.

The surface of the photosensitive member was charged to −500 V by a charger, and irradiated with a halogen lamp, and an half-reduction exposure E½ which is necessary for reducing the surface potential to a half of an original level was measured.

Hydrazone compound (H - 2)

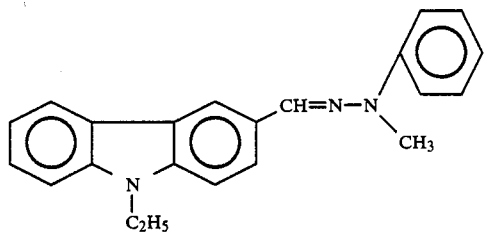

Table 7 lists the measurement results.

EXAMPLES 10-12

Using respective azo compounds (P - 5 through P - 8) and hydrazone compound (H - 2), these examples were performed in same way as Example 9. Table 7 lists the results.

EXAMPLES 13-16

Using respective azo compounds (P - 5 through P - 8) and butadiene compound (H - 3) shown below, these examples were performed in a same way as Example 9. Table 7 lists the results.

Butadiene compound H - 3

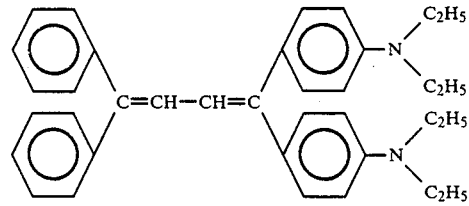

Table 7 lists the results.

TABLE 7

| Example | Carrier-generating material | Carrier-transporting material | E½ (lux · sec) |
|---|---|---|---|
| 1 | P - 1 | H - 1 | 4.1 |
| 2 | P - 2 | H - 1 | 3.4 |
| 3 | P - 3 | H - 1 | 6.5 |
| 4 | P - 4 | H - 1 | 3.9 |
| 5 | P - 1 | H - 2 | 5.5 |
| 6 | P - 2 | H - 2 | 7.0 |
| 7 | P - 3 | H - 2 | 8.0 |
| 8 | P - 4 | H - 2 | 4.1 |
| 9 | P - 5 | H - 2 | 8.0 |
| 10 | P - 6 | H - 2 | 8.1 |
| 11 | P - 7 | H - 2 | 8.7 |
| 12 | P - 8 | H - 2 | 7.8 |
| 13 | P - 5 | H - 3 | 3.6 |
| 14 | P - 6 | H - 3 | 4.0 |
| 15 | P - 7 | H - 3 | 4.5 |
| 16 | P - 8 | H - 3 | 3.6 |

What is claimed is:

1. A photosensitive member comprising a charge generating layer and a charge transporting layer, within the charge generating layer comprises a bisazo compound represented by the following General Formula (I) or (II):

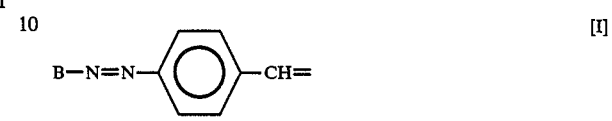

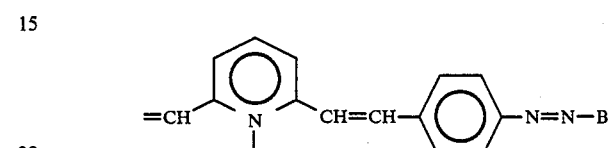

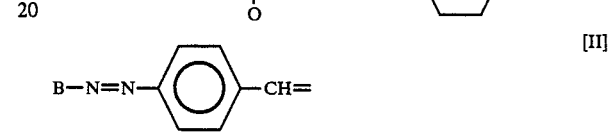

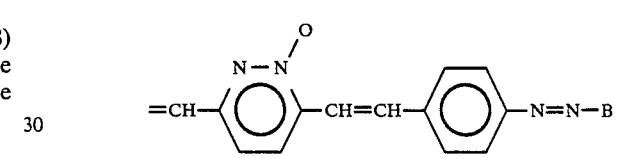

wherein B represents a coupler expressed by any one of Formula (III) through (VIII):

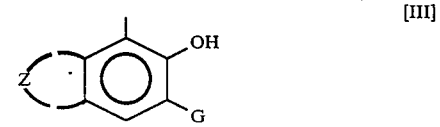

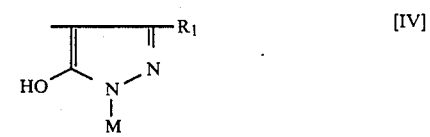

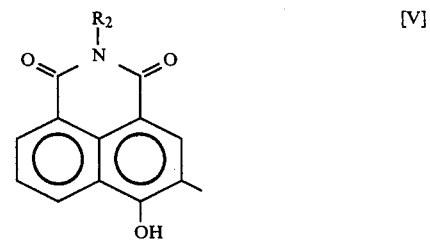

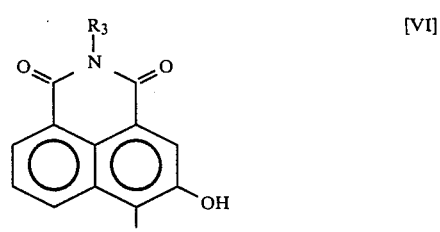

-continued

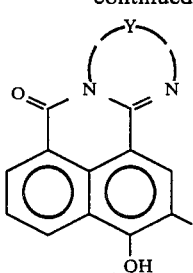  [VII]

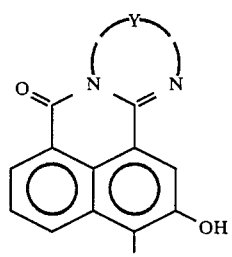  [VIII]

where,
Z represents a group of atoms necessary for forming an aromatic carbon ring or an aromatic heterocycle each of which may have a substituent;

G represents a carbamoyl group or a sulfamoyl group, each of which may have a substituent;

$R_1$ represents a hydrogen atom, an alkyl group, an amino group or a carbamoyl group, each of which may have a substituent, a carboxyl group or an ester group thereof, or a cyano group;

M represents an aryl group which may have a substituent;

$R_2$ and $R_3$ independently represent an alkyl group or an aralkyl group, each of which may have a substituent or an unsubstituted aryl group;

Y represents a bivalent aromatic hydrocarbon group or a group having a nitrogen atom within a ring.

2. A photosensitive member having a photoconductive layer formed by dispersing a charge generating material and a charge transporting material in a binder resin on an electrically conductive substrate, wherein the charge generating material comprises a bisazo compound represented by the following General Formula (I) or (II):

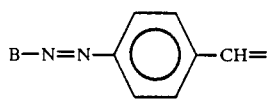  [I]

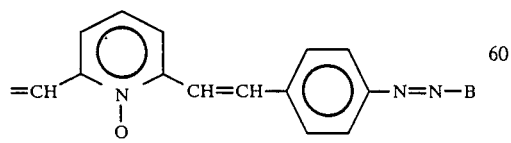

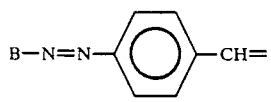  [II]

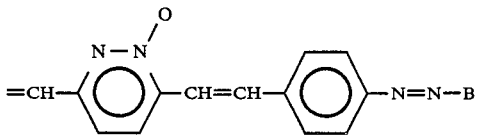  [VII]

wherein B represents a coupler expressed by any one of Formula (III) through (VIII):

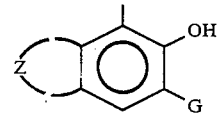  [III]

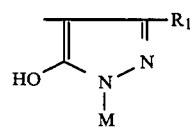  [IV]

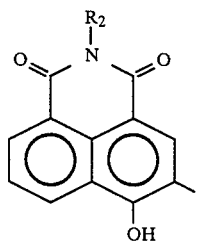  [V]

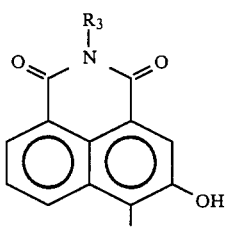  [VI]

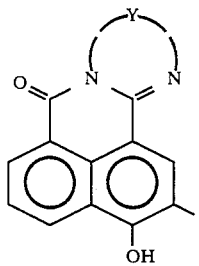  [VII]

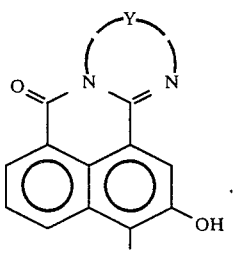  [VIII]

where,
Z represents a group of atoms necessary for forming an aromatic carbon ring or an aromatic heterocycle each of which may have a substituent;

G represents a carbamoyl group or a sulfamoyl group each of which may have a substituent;

$R_1$ represents a hydrogen atom, or an alkyl group, an amino group or a carbamoyl group, each of which may have a substituent, a carboxyl group or an ester group thereof, or a cyano group;

M represents an aryl group which may have a substituent;

$R_2$ and $R_3$ independently represent an alkyl group or an aralkyl group, each of which may have a substituent or an unsubstituted aryl group;

Y represents a bivalent aromatic hydrocarbon group or a group having a nitrogen atom within a ring.

3. A photosensitive member of claim 1, wherein the thickness of the charge generating layer is from 0.01 to 5 μm.

4. A photosensitive member of claim 1, wherein the thickness of the charge transporting layer is from 2 to 100 μm.

5. A photosensitive member of claim 1, wherein the charge transporting layer comprises a butadiene compound represented by the following formula;

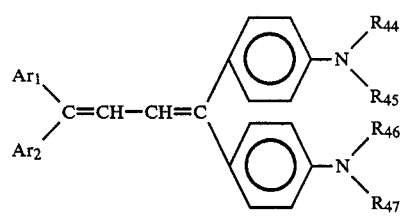

wherein $Ar_1$ and $Ar_2$ independently represent an aromatic hydrocarbon residue such as a phenyl group or a naphthyl group; $R_{44}$ through $R_{47}$ independently represent an alkyl group such as a methyl group or an ethyl group; or an aryl group such as a phenyl group or a naphthyl group; or a benzyl group.

6. A photosensitive member of claim 2, wherein the thickness of the photoconductive layer is from 5 to 30 μm.

7. A photosensitive member of claim 2, wherein the charge transporting material is a butadiene compound represented by the following formula;

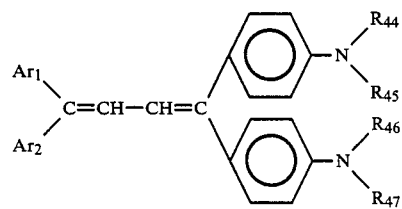

wherein $Ar_1$ and $Ar_2$ independently represent an aromatic hydrocarbon residue such as a phenyl group or a naphthyl group; $R_{44}$ through $R_{47}$ independently represent an alkyl group such as a methyl group or an ethyl group; or an aryl group such as a phenyl group or a naphthyl group; or a benzyl group.

* * * * *